United States Patent
Carey et al.

(10) Patent No.: US 11,098,248 B2
(45) Date of Patent: *Aug. 24, 2021

(54) PASSIVATION OF METAL HALIDE SCINTILLATORS

(71) Applicant: Siemens Medical Solutions USA, Inc., Malvern, PA (US)

(72) Inventors: Alexander Andrew Carey, Lenoir City, TN (US); Peter Carl Cohen, Knoxville, TN (US); Mark S. Andreaco, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/105,039

(22) Filed: Aug. 20, 2018

(65) Prior Publication Data

US 2018/0355245 A1 Dec. 13, 2018

Related U.S. Application Data

(63) Continuation-in-part of application No. 14/994,181, filed on Jan. 13, 2016, now Pat. No. 10,087,367, which is a continuation-in-part of application No. 14/153,290, filed on Jan. 13, 2014, now Pat. No. 9,328,287.

(60) Provisional application No. 61/754,737, filed on Jan. 21, 2013.

(51) Int. Cl.
*C09K 11/77* (2006.01)
*C09K 11/08* (2006.01)
*G21K 4/00* (2006.01)

(52) U.S. Cl.
CPC ...... *C09K 11/7705* (2013.01); *C09K 11/0827* (2013.01); *C09K 11/7772* (2013.01); *G21K 4/00* (2013.01)

(58) Field of Classification Search
CPC ............ C09K 11/7705; C09K 11/0827; C09K 11/0833; C09K 11/7772; G21K 4/00
See application file for complete search history.

(56) References Cited

U.S. PATENT DOCUMENTS

| | | | |
|---|---|---|---|
| 4,297,584 A | 10/1981 | Buchanan et al. | |
| 7,067,816 B2* | 6/2006 | Dorenbos | C09K 11/7772 250/370.11 |
| 7,435,975 B2* | 10/2008 | Shoji | G01T 1/202 250/367 |
| 8,486,300 B2* | 7/2013 | Gundiah | C30B 29/12 252/301.4 H |
| 9,328,287 B2* | 5/2016 | Carey | C09K 11/7719 |
| 10,087,367 B2* | 10/2018 | Carey | C09K 11/7733 |
| 2010/0001209 A1* | 1/2010 | Osinski | C09K 11/7773 250/459.1 |
| 2011/0165422 A1 | 7/2011 | Gundiah et al. | |
| 2014/0203210 A1 | 7/2014 | Carey et al. | |
| 2016/0068748 A1* | 3/2016 | Sakuragi | C30B 11/00 250/361 R |

FOREIGN PATENT DOCUMENTS

| | | | |
|---|---|---|---|
| CN | 102534804 | * | 7/2012 |
| CN | 102534804 A | | 7/2012 |
| JP | S53131987 A | | 11/1978 |
| JP | S6215499 A | | 1/1987 |
| JP | 2014-029314 A | | 2/2014 |
| WO | 2009144982 A1 | | 12/2009 |
| WO | 2013055648 A1 | | 4/2013 |

OTHER PUBLICATIONS

Abstract for CN 102534804, Jul. 4, 2012.*
Translation for CN 102534804, Jul. 4, 2012.*
Phosphor Handbook, 2nd ed.; edited by Shionoya, Yen, Yamamoto; 2007, p. 662.*
Extended European Search Report for Corresponding European Patent Application No. 16205452.2, dated Jun. 21, 2017.
Office Action received for Corresponding Japanese Application No. 2017-004284 dated Nov. 21, 2017, with translation.

* cited by examiner

*Primary Examiner* — C Melissa Koslow

(57) ABSTRACT

Disclosed herein is a material, comprising a first metal halide that is operative to function as a scintillator; where the first metal halide excludes cesium iodide, strontium iodide, and cesium bromide; and a surface layer comprising a second metal halide that is disposed on a surface of the first metal halide; where the second metal halide has a lower water solubility than the first metal halide.

18 Claims, No Drawings

PASSIVATION OF METAL HALIDE SCINTILLATORS

CROSS-REFERENCE TO RELATED APPLICATIONS

This application is a Continuation-In-Part of U.S. Pat. No. 10,087,367 filed on Jan. 13, 2016, which is a Continuation-In-Part of U.S. Pat. No. 9,328,287 filed on Jan. 13, 2014, which claims priority to U.S. Provisional Application Ser. No. 61/754,737, filed on Jan. 21, 2013, the entire contents of which are hereby incorporated by reference.

TECHNICAL FIELD

This disclosure relates to scintillator materials and particularly to metal halide scintillator materials. Certain arrangements also relate to specific compositions of such scintillator material and method of making the same.

BACKGROUND

Scintillator materials, which emit light pulses in response to impinging radiation, find a wide range of applications, including medical imaging, particle physics and geological exploration. While a variety of scintillator materials have been made, there is a continuous need for superior scintillator materials.

SUMMARY

The present disclosure relates to halide scintillator materials that include a bulk metal halide scintillator material with one or more passivation surface layers that have a lower hygroscopicity, or solubility in water, than the bulk material, thereby protecting the bulk scintillator material from moisture.

In one example, a starting metal halide scintillator material, such as a $LaBr_3$:Ce crystal, is treated with a material, such as $F_2$ or $BF_3$ gas, that reacts with the starting material to form a surface layer of a compound, such as $LaF_3$, that is less hygroscopic than the starting material.

In another example, a material comprises a metal halide crystal, which can be a scintillator crystal, such as a $LaBr_3$:Ce crystal, with a coating of a less hygroscopic material, such as $LaF_3$.

DESCRIPTION

Disclosed herein are metal halide scintillators that have passivated surfaces. The passivated surface also comprises a metal halide where the halogen atom of the surface has a lower atomic number than the halogen atom of the metal halide scintillator. The scintillators can comprise single crystals, a polycrystalline material a combination of single and polycrystalline materials.

Put another way, a metal halide scintillator comprises a first metal halide upon which is disposed a second metal halide, where the second metal halide comprises a halogen atom that has a lower atomic number than the halogen atom of the first metal halide. Put yet another way, a metal halide scintillator comprises a first metal halide core upon which is disposed a layer of a second metal halide, where the second metal halide comprises a halogen atom that has a lower atomic number than the halogen atom of the first metal halide. The first metal halide is a scintillator that comprises a single crystal, a polycrystalline material or a combination of single and polycrystalline materials.

The second metal halide may or may not display scintillation but passivates the first metal halide. In an embodiment, the second metal halide has a lower solubility in water than the first metal halide. The second metal halide is less hygroscopic than the first metal halide and protects the first metal halide from being solubilized by water present in the atmosphere. It permits the resulting scintillator to have a longer shelf life than it would have otherwise had. It also permits a more accurate calibration of the scintillator for use in devices such as positron emission tomography (PET), computed tomography (CT), or single photon emission computed tomography (SPECT) machines and in other imaging devices. A material comprising a first metal halide and a second metal halide may be used in an article. The first metal halide is operative to function as a scintillator; where the first metal halide excludes cesium iodide, strontium iodide, strontium fluoride and cesium bromide. A surface layer comprises the second metal halide. The second metal halide is disposed on a surface of the first metal halide; where the second metal halide has a lower water solubility than the first metal halide.

Metal halides constitute a large class of scintillators. For example, NaI:Tl is one of the first single crystal scintillators discovered and is still widely used. Another popular example is $SrI_2$:Eu. In general, the solubility of the metal halide increases in transitioning down the series (F>Cl>Br>I). Any element above in the series can displace one below it. In short, it is desirable for the halogen atom of the first halide metal to be replaced by a halogen atom having a lower atomic number in the second metal halide. For example, chlorine (or HCl) can displace an iodide anion and fluorine can displace chlorine. Thus, a metal halide fluorinated surface should in general be less hygroscopic, or water soluble, than the other possible halides.

Cerium doped lanthanum bromide, $LaBr_3$:Ce, for example, is an excellent scintillator, with a high light output, narrow energy resolution, short decay time and excellent timing resolution. However, $LaBr_3$:Ce has a serious drawback: its hygroscopic behavior, i.e. high solubility in water. According to one aspect of the present disclosure, a layer of material like $LaF_3$ can be formed on the $LaBr_3$:Ce. $LaF_3$ makes a good coating because it has a solubility of only about 2 ppm.

It is desirable for both the first metal halide and the second metal halide to be scintillators. However, it may be noted that the second metal halide (which passivates the surface of the first metal halide) may not be a scintillator. If the second metal halide is not a scintillator, it is desirable that it passivates the surface of the first metal halide while not absorbing to much of the light that is emitted by the first metal halide. If the second metal halide is not a scintillator and serves only the function of a passivator, it is desirable for it to transmit 60% or more, preferably 70% of more, preferably 80% or more, preferably 90% or more and more preferably 98% or more of the light from the first metal halide that is incident upon it.

First Metal Halide

In an embodiment, the first metal halide has a composition that is described by formula (1):

$$M^1X^1_a:Y_b \qquad (1)$$

where $M^1$ is a metal that is lithium, sodium, potassium, rubidium, cesium, thallium, copper, silver, lead, bismuth, indium, tin, antimony, tantalum, tungsten, strontium, barium, boron, magnesium, calcium, cerium, yttrium, scandium, gadolinium, lanthanum, lutetium, praseodymium, terbium, ytterbium, samarium, europium, holmium, dysprosium, erbium, thulium, or neodymium, $X^1$ is a halogen, where the halogen is chlorine, bromine, iodine, astanine, or a combination thereof and were Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium. In the formula (1), a has a value of 1 to 4, 1 to 3 and 2 to 3, while b has a value of 0 to about 1, preferably about 0.001 to about 0.5 and more preferably about 0.003 to about 0.3. In the Formula (1), $M^1$ and Y are different from each other.

In an exemplary embodiment, $M^1$ is preferably sodium, potassium, calcium, cerium, cesium, barium, lanthanum, or lutetium; while $X^1$ is preferably chlorine, bromine, iodine, or a combination thereof and Y is preferably cerium, europium, potassium or thallium. The first metal halide excludes cesium iodide, strontium iodide, strontium fluoride and cesium boride.

Exemplary scintillators of the first metal halide having the composition detailed by Formula (1) are NaI:Tl, KI:Tl, CsI:Tl, LaCl$_3$:Ce (e.g., LaCl$_3$:Ce$^{3+}$), LaBr$_3$:Ce (e.g., LaBr$_3$:Ce$^{3+}$), LuCl$_3$:Ce (e.g., LuCl$_3$:Ce$^{3+}$), LuBr$_3$:Ce (e.g., LuBr$_3$:Ce$^{3+}$), SrI$_2$:Eu (e.g., SrI$_2$:Eu$^{2+}$), or a combination thereof.

In another embodiment, the first metal halide has a composition that is described by Formula (2), Formula (3) or Formula (4):

$$M^1_l M^2_m X^1_a : Y_b \quad (2)$$

$$M^1_l M^2_m M^3_n X^1_a : Y_b \quad (3) \text{ and}$$

$$M^1_l M^2_m M^3_n M^4_o X^1_a : Y_b \quad (4),$$

where in the Formulas (2), (3) and (4) wherever applicable, $M^1$ is lithium, sodium, potassium, rubidium, gadolinium, cesium, thallium, copper, silver, lead, bismuth, indium, tin, antimony, tantalum, tungsten, strontium, barium, boron, magnesium, calcium, cerium, yttrium, scandium, lanthanum, lutetium, praseodymium, terbium, ytterbium, samarium, europium, holmium, dysprosium, erbium, thulium, or neodymium, $M^2$ is selected from the group consisting of boron, aluminum, gallium, indium, sodium, potassium, calcium, gadolinium, rubidium, cesium, thallium, cerium, yttrium, scandium, lanthanum, lutetium, praseodymium, terbium, ytterbium, samarium, europium, holmium, dysprosium, erbium, thulium, or neodymium, $M^3$ and $M^4$ are different from one another and are one of strontium, calcium, barium, gadolinum, yttrium, scandium, lanthanum, lutetium, praseodymium, terbium, ytterbium, samarium, europium, holmium, dysprosium, erbium, thulium, or neodymium. The term "wherever applicable" is used to denote that some of the terms (e.g., $M^3$ and $M^4$) may not be applicable to certain formulas. For example, $M^3$ does not apply to Formula (2) and $M^4$ does not apply to Formula (3).

In the Formulas (2), (3) and (4), $X^1$ is a halogen selected from chlorine, bromine, iodine, astinine, or a combination thereof, Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium, where l is 0 to 3, 1 to 3, or 2 to 3, m is 0 to 3, 1 to 3, or 2 to 3, n is 0 to 3, 1 to 3, or 2 to 3, and o is 0 to 3, 1 to 3, or 2 to 3, where the sum of l+m in Formula (2) is not equal to 0, where the sum of l+m, m+n, l+n and l+m+n is not equal to 0 in Formula (3) and where the sum of l+m, m+n, l+n, l+o, m+o, n+o and l+m+n+o is not equal to 0 in the Formula (4); where in the Formulas (2), (3) and (4), "a" is 1 to 8, 2 to 7, 3 to 6 and 4 to 5, and "b" has a value of 0 to about 1, preferably about 0.001 to about 0.5 and more preferably about 0.003 to about 0.3.

In the Formula (2), $M^1$, $M^2$ and Y are different from each other and only one of $M^1$ or $M^2$ is a rare earth metal. In an embodiment in the Formula (2), $M^2$ and Y are different from each other and both may or may not be rare earth metals. In the Formula (3) $M^1$, $M^2$, $M^3$ and Y are different from each other and at least one of $M^1$, $M^2$ and $M^3$ is a rare earth metal. In an embodiment in the Formula (3), $M^2$, $M^3$ and Y are different from each other and may or may not be rare earth metals.

In the Formula (4), $M^1$, $M^2$, $M^3$ and $M^4$ and Y are each different from each other and at least one of $M^1$, $M^2$, $M^3$ and $M^4$ and Y are rare earth metals. In an embodiment, at least two of $M^1$, $M^2$, $M^3$ and $M^4$ and Y are rare earth metals and are different from each other.

Examples of compounds having the Formula (2) are K$_2$LaCl$_5$:Ce$^{3+}$, K$_2$LaBr$_5$:Ce$^{3+}$, K$_2$LaI$_5$:Ce$^{3+}$, Na$_2$LaBr$_5$:Ce$^{3+}$, RbGd$_2$Br$_7$:Ce$^{3+}$, CsGd$_2$Br$_7$:Ce$^{3+}$, and the like.

Examples of compounds having the Formula (3) are Cs$_2$LiYCl$_6$:Ce$^{3+}$, Cs$_2$LiYBr$_6$:Ce$^{3+}$, Cs$_2$NaYCl$_6$:Ce$^{3+}$, Cs$_2$NaLaCl$_6$:Ce$^{3+}$, Cs$_2$NaLuCl$_6$:Ce$^{3+}$, Cs$_2$LiLaCl$_6$:Ce$^{3+}$, Rb$_2$NaYCl$_6$:Ce$^{3+}$, Rb$_2$NaLaCl$_6$:Ce$^{3+}$, Cs$_2$LiYI$_6$:Ce$^{3+}$, and the like.

The Second Metal Halide

The second metal halide has a composition that is described by formula (5):

$$M^1 X^2_a : Y_b \quad (5)$$

where $M^1$, Y, a and b are detailed above in the Formula (1), where $X^2$ is a halogen, where the halogen is fluorine, chlorine, bromine, iodine, or a combination thereof and were $X^2$ in the Formula (5) has a lower atomic weight than $X^1$ in the Formulas (1), (2), (3) or (4). When $X^2$ and $X^1$ both involve a combination of halogen atoms, then the combined atomic weight of $X^2$ is less than $X^1$. When $X^2$ involves a combination of halogen atoms, but $X^1$ contains only a single halogen atom, then $X^2$ contains at least one halogen atom that has a lower atomic weight than the single halogen atom contained in $X^1$. In other words, $X^2$ in the Formula (5) is a halogen that is fluorine, chlorine, bromine, iodine, or a combination thereof and that has at least one halogen atom having a lower atomic weight than any of the halogen atoms in $X^1$ in the Formula (1).

Exemplary scintillators of the second metal halide having the composition detailed by Formula (5) are NaF:Tl, CsF:Tl, BaF$_2$, CaF$_2$(Eu), LaF$_3$:Ce (e.g., LaF$_3$:Ce$^{3+}$), LaBr$_3$:Ce (e.g., LaBr$_3$:Ce$^{3+}$), LuCl$_3$:Ce (e.g., LuCl$_3$:Ce$^{3+}$), LuBr$_3$:Ce (e.g., LuBr$_3$:Ce$^{3+}$), or SrF$_2$:Eu (e.g., SrF$_2$:Eu$^{2+}$), LaFBr$_2$, LaF$_2$Br, or a combination thereof.

In another embodiment, the second metal halide has a composition that is described by Formula (6) through Formula (8):

$$M^1_l M^2_m X^2_a : Y_b \quad (6)$$

$$M^1_l M^2_m M^3_n X^2_a : Y_b \quad (7) \text{ and}$$

$$M^1_l M^2_m M^3_n M^4_o X^2_a : Y_b \quad (8),$$

where $M^1$, $M^2$, $M^3$, $M^4$, X, Y, l, m, n, o, a and b from the Formulas (6), (7) and (8) are defined above in Formulas (2) (3) and (4) and where $X^2$ from the Formulas (6), (7) and (8) has a lower atomic weight than $X^1$ in Formulas (1), (2), (3) and (4).

It is to be noted that the invention represented by the Formulas (1) through (8) excludes first metal halides that include cesium iodide (CsI), strontium iodide or cesium bromide (CsBr) scintillator crystals.

In an embodiment, the second metal halide may fully or partially cover the entire surface of the first metal halide. In another embodiment, the protective layer may comprises a third metal halide layer that is disposed on the second metal halide layer, where the third metal halide layer has a halogen atom that is lower in atomic weight than the halogen atom of the second metal halide layer. In short, the scintillator may comprise a plurality of protective layers where each succeeding outer layer (as one moves away from the core towards the outermost surface) contains a metal halide that has a halogen atom with a lower atomic weight than the halogen atom of the metal halide of the preceding layer.

In another embodiment, the second metal halide layer may be produced by treating the surface of the first metal halide with a halogen having a lower atomic number than the atomic number of the halogen contained in the first metal halide. For example, a first metal halide of lanthanum boride may be treated with chlorine (or a chlorinating agent) to convert some of the lanthanum boride at the surface to form a passivating layer of lanthanum chloride. The lanthanum chloride at the surface of the scintillator may then be treated with fluorine (or a fluorinating agent) to form a layer of lanthanum fluoride on the layer of lanthanum chloride.

Alternatively, as discussed below the lanthanum boride may be treated with only fluorine to form a layer of lanthanum fluoride which passivates the surface of the lanthanum boride In another aspect of the present disclosure, fluorine gas ($F_2$) or multiple other strong fluorinating agents can be used to fluorinate the surface of metal halide crystals such as $LaBr_3$. Fluorine in the fluorine gas simply displaces bromine on the surface according to the reaction:

$$2LaBr_3 + 3F_2 \rightarrow 2LaF_3 + 3Br_2.$$

The gas phase reaction of $F_2$ simply displaces the bromide ions at or near the surface and is thermodynamically preferred. Light and heat can control the amount of fluorination. Fluorination for passivating materials has been used in industry, particularly in semiconductor industry. The fluorination process is thus well known to those skilled in the art.

In another aspect of the preset disclosure, successive coating layers of lanthanum fluoride/bromide occur:

$LaBr_3$-? $LaFBr_2$-? $LaF_2Br$-? $LaF_3$.

In other words, the first metal halide is $LaBr_3$, the second metal halide comprises $LaFBr_2$, the third metal halide comprises $LaF_2Br$ and the fourth metal halide comprises $LaF_3$.

Thus, the surface of the crystal is passivated and can simplify the manufacture of such crystals.

In another aspect of the disclosure, a fluorinating agent is boron trifluoride $BF_3$. This volatile gas is a classic Lewis acid, and as such is a source of labile fluorine. The reaction can be expressed as:

$$LaBr_3 + BF_3 \rightarrow LaF_3 + BBr_3.$$

Boron tribromide ($BBr_3$) is volatile and can be removed in a vacuum. $BF_3$ would also make a good catalyst for fluorination using $F_2$.

In a further aspect of the disclosure, anhydrous HF can also be used to provide fluorine, which displaces a lower halogen. For example, HF can be used with $SrI_2$:Eu.

Other fluorinating agents include, but not limited to: $PF_5$, $SbF_5$, $SF_4$, $NF_3$, $SIF_4$, $WF_6$, $C_1F_3$, $BrF_5$ (and other interhalogen gases) and xenon fluorides.

The fluorination procedure can also be used on other metal halides, such as NaI.

Thus, metal halide scintillators and scintillation detectors with improved stability against moisture can be made by forming one or more surface layers of halides of lower solubility than the interior region of the metal halide. Because many embodiments of the invention can be made without departing from the spirit and scope of the invention, the invention resides in the claims hereinafter appended.

In a further aspect of the disclosure, a method of producing a scintillator material includes disposing on a surface of a first metal halide a layer comprising a second metal halide; where the first metal halide is a scintillator and excludes cesium iodide, strontium iodide and cesium bromide; and where the second metal halide has a lower water solubility than the first metal halide.

We claim:

1. A material, comprising:
a first metal halide that is operative to function as a scintillator; where the first metal halide excludes cesium iodide, strontium iodide and cesium bromide; and
a surface layer comprising a second metal halide that is disposed on a surface of the first metal halide; where the second metal halide has a lower water solubility than the first metal halide, where another layer that comprises a third metal halide is disposed on a surface of the second metal halide; and wherein the third metal halide has a lower water solubility than the second metal halide.

2. The material of claim 1, wherein the first metal halide has a composition that is described by formula (1):

$$M^1 X^1_a : Y_b \qquad (1)$$

where $M^1$ is a metal that is lithium, sodium, potassium, rubidium, cesium, thallium, copper, silver, lead, bismuth, indium, tin, antimony, tantalum, tungsten, strontium, barium, boron, magnesium, calcium, cerium, yttrium, scandium, gadolinium, lanthanum, lutetium, praseodymium, terbium, ytterbium, samarium, europium, holmium, dysprosium, erbium, thulium, or neodymium, $X^1$ is a halogen, where the halogen is chlorine, bromine, iodine, astanine, or a combination thereof and were Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium, where $M^1$ and Y are different elements, where a has a value of 1 to 4 and where b has a value of 0 to about 1 and where the second metal halide has a composition that is described by formula (5)

$$M^1 X^2_a : Y_b \qquad (5)$$

where $M^1$, Y, a and b are detailed above in the Formula (1), where $X^2$ in the Formula (5) is a halogen that is fluorine, chlorine, bromine, iodine, or a combination thereof and that has at least one halogen atom having a lower atomic weight than $X^1$ in the Formula (1).

3. The material of claim 2, where b has a value of about 0.001 to about 0.5 and where "a" has a value of 1, 2 or 3.

4. The material of claim 2, where when $X^2$ and $X^1$ both involve a combination of halogen atoms, the combined atomic weight of $X^2$ is less than $X^1$ or alternatively, when $X^2$ involves a combination of halogen atoms, but $X^1$ contains only a single halogen atom, then $X^2$ contains at least one halogen atom that has a lower atomic weight than the single halogen atom contained in $X^1$.

5. The material of claim 1, where the first metal halide has a composition that is described by Formula (2), Formula (3) or Formula (4):

$$M^1_l M^2_m X^1_a : Y_b \quad (2)$$

$$M^1_l M^2_m M^3_n X^1_a : Y_b \quad (3) \text{ and}$$

$$M^1_l M^2_m M^3_n M^4_o X^1_a : Y_b \quad (4),$$

where in the Formulas (2), (3) and (4), where applicable, $M^1$ is lithium, sodium, potassium, calcium, rubidium, gadolinium, cesium, thallium, copper, silver, lead, bismuth, indium, tin, antimony, tantalum, tungsten, strontium, barium, boron, magnesium, calcium, cerium, yttrium, scandium, lanthanum, lutetium, praseodymium, terbium, ytterbium, samarium, europium, holmium, dysprosium, erbium, thulium, or neodymium, $M^2$ is selected from the group consisting of boron, aluminum, gallium, indium, sodium, potassium, calcium, gadolinium, rubidium, cesium, thallium, cerium, yttrium, scandium, lanthanum, lutetium, praseodymium, terbium, ytterbium, samarium, europium, holmium, dysprosium, erbium, thulium, or neodymium, $M^3$ and $M^4$ are different from one another and are one of strontium, calcium, barium, gadolinum, yttrium, scandium, lanthanum, lutetium, praseodymium, terbium, ytterbium, samarium, europium, holmium, dysprosium, erbium, thulium, or neodymium, $X^1$ is a halogen selected from chlorine, bromine, iodine, astinine, or a combination thereof; Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium, where l is 0 to 3, m is 0 to 3, n is 0 to 3, and o is 0 to 3, and where the sum of l+m in Formula (2) is not equal to 0, where the sum of l+m, m+n, l+n and l+m+n is not equal to 0 in Formula (3) and where the sum of l+m, m+n, l+n, l+o, m+o, n+o and l+m+n+o is not equal to 0 in the Formula (4); where in the Formulas (2), (3) and (4), "a" is 1 to 8, and "b" is 0 to about 1; where in the Formula (2), $M^1$, $M^2$ and Y are different from each other and only one of $M^1$ or $M^2$ is a rare earth metal; where in the Formula (3), $M^1$, $M^2$, $M^3$ and Y are different from each other and at least one of $M^1$, $M^2$ and $M^3$ is a rare earth metal and where embodiment in the Formula (3), $M^2$, $M^3$ and Y are different from each other and both may or may not be rare earth metals and where in the Formula (4), $M^1$, $M^2$, $M^3$ and $M^4$ and Y are each different from each other and at least one of $M^1$, $M^2$, $M^3$ and $M^4$ and Y are rare earth metals.

6. The material of claim 5, where the second metal halide has a composition that is described by formula (5)

$$M^1 X^2_a : Y_b \quad (5)$$

where $M^1$ is a metal that is lithium, sodium, potassium, rubidium, cesium, thallium, copper, silver, lead, bismuth, indium, tin, antimony, tantalum, tungsten, strontium, barium, boron, magnesium, calcium, cerium, yttrium, scandium, gadolinium, lanthanum, lutetium, praseodymium, terbium, ytterbium, samarium, europium, holmium, dysprosium, erbium, thulium, iodine, or neodymium, $X^1$ is a halogen, where the halogen is chlorine, bromine, iodine, astanine, or a combination thereof and were Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium, where $M^1$ and Y are different elements, where a has a value of 1 to 4 and where b has a value 0 to about 1 and where $X^2$ in the Formula (5) is a halogen that is fluorine, chlorine, bromine, iodine, or a combination thereof and that has at least one halogen atom having a lower atomic weight than $X^1$ in the Formulas (2), (3) and (4).

7. The material of claim 5, where the second metal halide has a composition that is described by formulas (6) through (8)

$$M^1_l M^2_m X^2_a : Y_b \quad (6)$$

$$M^1_l M^2_m M^3_n X^2_a : Y_b \quad (7) \text{ and}$$

$$M^1_l M^2_m M^3_n M^4_o X^2_a : Y_b \quad (8),$$

where $M^1$, $M^2$, $M^3$, $M^4$, X, Y, l, m, n, o, a and b from the Formulas (6), (7) and (8) are defined above in Formulas (2) (3) and (4) and where $X^2$ from the Formulas (6), (7) and (8) has a lower atomic weight than $X^1$ in Formulas (2), (3) and (4).

8. The material of claim 6, where when $X^2$ and $X^1$ both involve a combination of halogen atoms, the combined atomic weight of $X^2$ is less than $X^1$ or alternatively, when $X^2$ involves a combination of halogen atoms, but $X^1$ contains only a single halogen atom, then $X^2$ contains at least one halogen atom that has a lower atomic weight than the single halogen atom contained in $X^1$.

9. The material of claim 7, where in formulas (6), (7) and (8) b has a value of about 0.001 to about 0.5 and where "a" has a value of 2 to 7.

10. The material of claim 1, where the first metal halide comprises Nat Tl, KI:Tl, $LaCl_3$:Ce, $LaBr_3$:Ce, $LuCl_3$:Ce, $LuBr_3$:Ce, or a combination thereof.

11. The material of claim 1, where the second metal halide comprises NaF:Tl, CsF:Tl, $BaF_2$, $CaF_2$(Eu), $LaF_3$:Ce, $LaBr_3$:Ce, $LuCl_3$:Ce, $LuBr_3$:Ce, $SrF_2$:Eu, $LaFBr_2$, $LaF_2Br$, or a combination thereof.

12. An article comprising the material of claim 1.

13. The article of claim 12, where the article is a positron emission tomography device, a computed tomography device, or single photon emission computed tomography device.

14. A method comprising:
disposing on a surface of a first metal halide a layer comprising a second metal halide;
where the first metal halide is a scintillator and excludes cesium iodide, strontium iodide and cesium bromide; and where the second metal halide has a lower water solubility than the first metal halide; and
disposing on a surface of the second metal halide a layer comprising a third metal halide; where the third metal halide has a lower water solubility than the second metal halide.

15. The method of claim 14, wherein the first metal halide has a composition that is described by formula (1):

$$M^1 X^4_a : Y_b \quad (1)$$

where M¹ is a metal that is lithium, sodium, potassium, rubidium, cesium, thallium, copper, silver, lead, bismuth, indium, tin, antimony, tantalum, tungsten, strontium, barium, boron, magnesium, calcium, cerium, yttrium, scandium, gadolinium, lanthanum, lutetium, praseodymium, terbium, ytterbium, samarium, europium, holmium, dysprosium, erbium, thulium, or neodymium, X¹ is a halogen, where the halogen is chlorine, bromine, iodine, astanine, or a combination thereof and were Y is a codopant and comprises and comprises one or more of thallium, copper, silver, lead, bismuth, indium, tin, antimony, tantalum, tungsten, strontium, barium, boron, magnesium, gadolinium, calcium, potassium, cerium, yttrium, scandium, lanthanum, lutetium, praseodymium, terbium, ytterbium, samarium, europium, holmium, dysprosium, erbium, thulium or neodymium, where M¹ and Y are different elements, where a has a value of 1 to 4 and where b has a value of 0 to about 1 and where the second metal halide has a composition that is described by formula (5)

$$M^1X^2_a:Y_b \tag{5}$$

where $M^1$, Y, a and b are detailed above in the Formula (1), where $X^2$ in the Formula (5) is a halogen that is fluorine, chlorine, bromine, iodine, or a combination thereof and that has at least one halogen atom having a lower atomic weight than $X^1$ in the Formula (1).

16. The method of claim 15, where b has a value of about 0.001 to about 0.5 and where "a" has a value of 1, 2 or 3.

17. The method of claim 15, where when $X^2$ and $X^1$ both involve a combination of halogen atoms, the combined atomic weight of $X^2$ is less than $X^1$ or alternatively, when $X^2$ involves a combination of halogen atoms, but $X^1$ contains only a single halogen atom, then $X^2$ contains at least one halogen atom that has a lower atomic weight than the single halogen atom contained in $X^1$.

18. The method of claim 14, where disposing on the second metal halide is produced by chlorinating or fluorinating the surface of a first metal halide.

\* \* \* \* \*